P. E. DAUBENSPECK.
LINK CONNECTION FOR TRACTION CHAINS.
APPLICATION FILED JAN. 19, 1920.
1,373,172.
Patented Mar. 29, 1921.
2 SHEETS—SHEET 1.
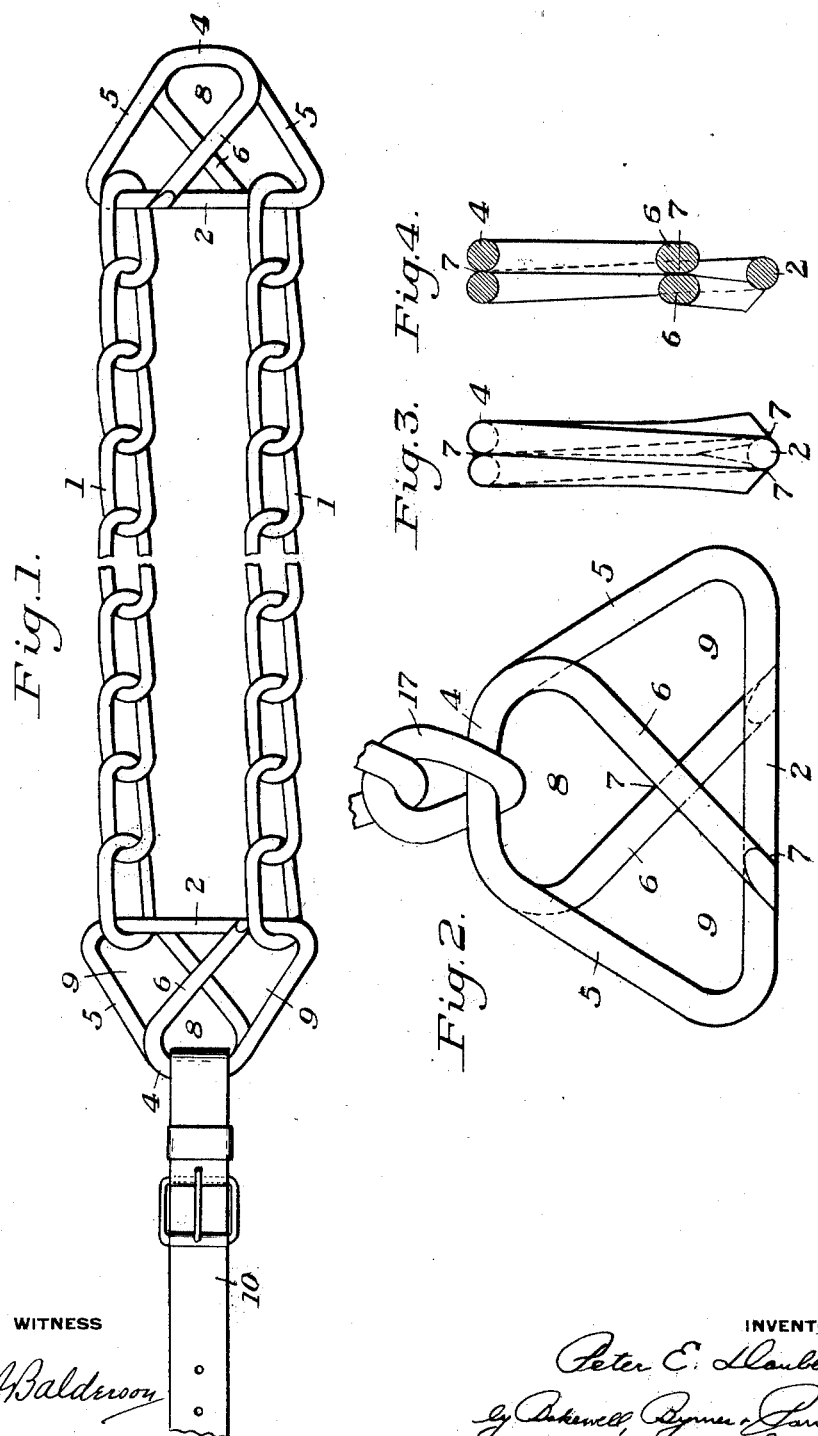

P. E. DAUBENSPECK.
LINK CONNECTION FOR TRACTION CHAINS.
APPLICATION FILED JAN. 19, 1920.
1,373,172.
Patented Mar. 29, 1921.
2 SHEETS—SHEET 2.
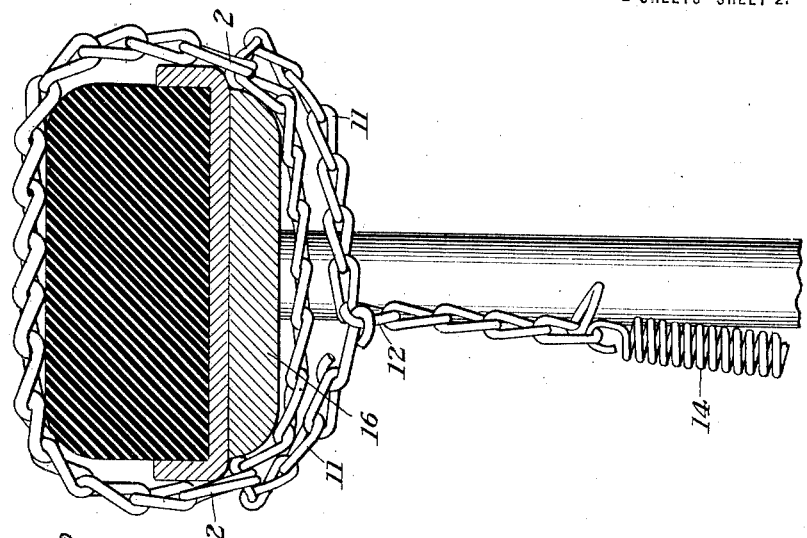
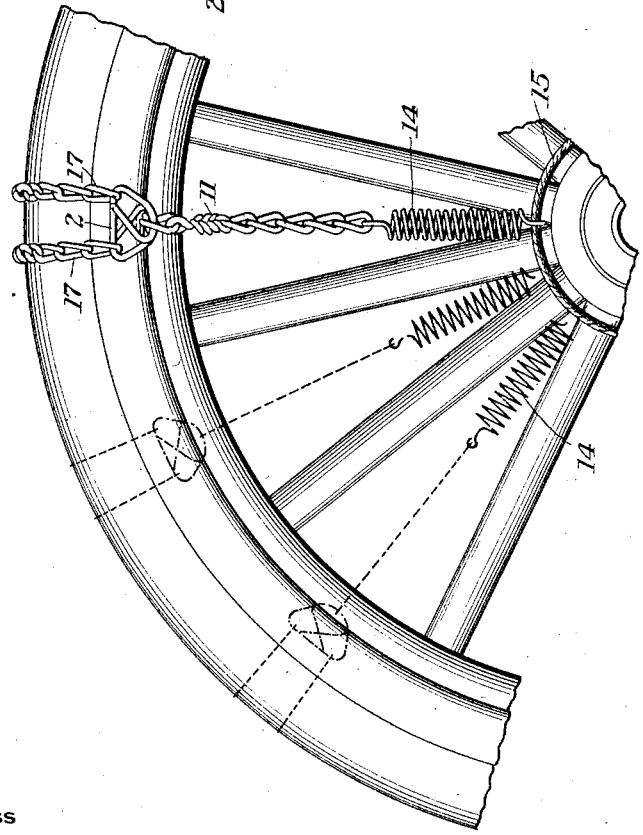
WITNESS
R A Balderson
INVENTOR
Peter E. Daubenspeck,
by Bakewell Byrnes & Parmelee
his Attys.

UNITED STATES PATENT OFFICE.

PETER E. DAUBENSPECK, OF BUTLER, PENNSYLVANIA.

LINK CONNECTION FOR TRACTION-CHAINS.

1,373,172.   Specification of Letters Patent.   Patented Mar. 29, 1921.

Application filed January 19, 1920. Serial No. 352,532.

*To all whom it may concern:*

Be it known that I, PETER E. DAUBENSPECK, a citizen of the United States, residing at Butler, in the county of Butler and State of Pennsylvania, have invented a new and useful Improvement in Link Connections for Traction-Chains, of which the following is a full, clear, and exact description.

The present invention relates broadly to link connections for chains, and more particularly to connections of this type especially adapted for use with traction chains for automobiles and the like.

The principal object of the present invention is to provide a link connection formed of a single piece of metal bent upon itself to form a plurality of eyes with intermediate bracing members.

Still another object of the invention is to provide a connection of the type described having a double bearing surface for one of the eyes.

A further object of the invention is to provide a double unit traction chain, the cross chains of which are carried by a rigid link connection serving to maintain the cross chains in predetermined spaced relation.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 1 is a plan view of a part of one form of traction chain unit having my improved link connection.

Fig. 2 is an enlarged detail view of one of the link connections having a securing link carried thereby in place of the strap shown in Fig. 1.

Fig. 3 is a side view of the structure shown in Fig. 2, the securing link being omitted.

Fig. 4 is a sectional view through the structure shown in Fig. 2, the securing link being omitted.

Fig. 5 is a side elevation of a portion of a wheel to which I have shown one of the traction chain units attached, and others diagrammatically, and Fig. 6 is an enlarged sectional view through the wheel felly of Fig. 6.

At the present time double unit traction chains, embodying two cross chains and a securing member, are extensively used owing to the ease and rapidity with which they can be applied to a wheel for either temporary or continued use. One objection to units of this type has been the tendency of the cross chains to distort the link connection carrying the same, thereby permitting the cross chains to come together. It is one of the objects of the present invention to overcome this tendency by providing a rigidly constructed link connection which, when used with double unit traction chains, will maintain the cross chains in predetermined spaced relation.

Referring more particularly to the drawings, there is illustrated in Fig. 1 a double unit traction chain comprising cross chains 1 carried by my improved link connections. Each of these connections preferably comprises a metallic bar or rod bent upon itself into generally triangular shape to form a base 2 and a top 4 connected by the sides 5. The ends of the bar or rod may then be bent to form braces 6 extending from the top to the base and crossed as shown particularly in Fig. 2. At each of the points 7 where portions of the bar or rod cross each other, they may be united by welding to form a rigid structure.

By bending the bar or rod in the manner described, it will be apparent that an eye 8 is formed adjacent the top of the link, and a pair of eyes 9 formed adjacent the base of the link. The portion of the base 2 extending between the eyes 9 forms a compression member preventing collapse of the sides 5 and holding the eyes in predetermined spaced relation so that the cross chains 1 secured therein are prevented from coming into contact. The braces 6 in like manner act as tension members preventing distortion of the base when subjected to the action of the cross chains.

The overlapping of the rod or bar about the top of the eye 8 forms a broad bearing surface equal to substantially twice the diameter of the material from which the link is formed. This feature is desirable as it increases the length of life of the securing strap 10 passing through the eye, or forms a broad surface around which the securing chain 11 may roll without binding, as clearly apparent from Fig. 6. With a securing chain of this character, as claimed in my Patent No. 1,341,301 of May 25, 1920, one end may be attached to an intermediate portion 12 and the other end secured to a resilient member 14 carried by a suitable ring or the like 15, in such manner that substantially one-half of the weight of the traction chain unit is carried by the felly 16.

In some instances, where the traction chain is to be used with wheels of standard types, each of the link connections may have one or more securing links 17 in the eye 8 forming means for securing the traction chains in position on the wheel.

The form of link connection illustrated adapts itself to any type of securing means now in use, and due to the broad bearing surface more successfully coöperates therewith.

The advantages of the present invention arise from the method of forming the link connection to provide a series of eyes maintained at all times in predetermined spaced positions by bracing and compression members, and from the broad bearing surface for one of the eyes.

I claim:

1. As an article of manufacture, a link connection comprising a metallic bar bent upon itself into generally triangular shape to form a base, a top, sides connecting the same, and braces extending from the top to the base between the sides and forming a plurality of eyes, substantially as described.

2. As an article of manufacture, a link connection comprising a metallic bar bent upon itself into generally triangular shape to form a base, a top, sides connecting the same, and cross braces extending from the top to the base between the sides and forming a plurality of eyes, substantially as described.

3. As an article of manufacture, a link connection comprising a metallic bar bent upon itself to form a base, a top, converging sides extending from the base to the top and connecting the same, and braces extending from the top to the base between the sides and forming a plurality of eyes, two of said eyes being adjacent the base and one of said eyes adjacent the top, substantially as described.

4. As an article of manufacture, a link connection comprising a metallic bar bent upon itself to form a base, a top, sides connecting the same, and braces extending from the top to the base between the sides and forming a plurality of eyes, two of said eyes being adjacent the base and one of said eyes adjacent the top, said last mentioned eye having a broader bearing surface than the first mentioned eyes, substantially as described.

5. As an article of manufacture, a link connection comprising a metallic bar bent upon itself to form a base, a top, sides connecting the same, and braces extending from the top to the base between the sides and forming a plurality of eyes, two of said eyes being adjacent the base and one of said eyes adjacent the top, said last mentioned eye having a double bearing surface, substantially as described.

6. As an article of manufacture, a link connection comprising a metallic bar bent upon itself to form a base, a top, sides connecting the same, and braces extending from the top to the base between the sides and forming a plurality of eyes, one of said eyes having a broader bearing surface than the other of said eyes, substantially as described.

7. As an article of manufacture, a link connection comprising a base, a top, diverging sides extending from the top of the base and connecting the same, and means intermediate the sides and extending from the top to the base and connected thereto for preventing distortion of the base, said base acting as a compression member preventing collapse of the sides, substantially as described.

8. As an article of manufacture, a link connection comprising a base, a top, sides connecting the same, and crossed means intermediate the sides and extending from the top to the base for preventing distortion of the base, said base acting as a compression member preventing collapse of the sides, substantially as described.

9. As an article of manufacture, a link connection comprising a metallic bar bent upon itself to form a base, a top, sides connecting the same, and crossed braces extending from the top to the base between the sides and forming a plurality of eyes, two of said eyes being adjacent the base and one of said eyes adjacent the top, said last mentioned eyes having a broader bearing surface than the first mentioned eyes, substantially as described.

In testimony whereof I have hereunto set my hand.

PETER E. DAUBENSPECK.